(12) United States Patent  
Sato et al.

(10) Patent No.: US 7,588,373 B1  
(45) Date of Patent: Sep. 15, 2009

(54) OPTICAL CONNECTOR PLUG

(75) Inventors: Takashi Sato, Tokyo (JP); Tomoya Terashima, Tokyo (JP); Michael Palmer, Plano, TX (US); Travis Atkins, Keller, TX (US); Jack Edwards, III, Lewisville, TX (US)

(73) Assignees: Sanwa Denki Kogyo Co., Ltd., Tokyo (JP); Connectivity Technologies, Inc. U.S.A.

( * ) Notice: Subject to any disclaimer, the term of this patent is extended or adjusted under 35 U.S.C. 154(b) by 0 days.

(21) Appl. No.: 12/219,085

(22) Filed: Jul. 16, 2008

(51) Int. Cl.  
*G02B 6/38* (2006.01)
(52) U.S. Cl. .......................................... 385/53; 385/59
(58) Field of Classification Search ........................ None  
See application file for complete search history.

(56) References Cited

U.S. PATENT DOCUMENTS 5,638,474 A * 6/1997 Lampert et al. ............... 385/78
6,250,817 B1 * 6/2001 Lampert et al. ............... 385/56
6,357,934 B1 * 3/2002 Driscoll et al. ................ 385/86
2004/0247252 A1 * 12/2004 Ehrenreich et al. ............ 385/58

* cited by examiner

*Primary Examiner*—Omar Rojas  
(74) *Attorney, Agent, or Firm*—Bacon & Thomas PLLC

(57) ABSTRACT

For easy operation under a high density mounting circumstance, a multiple type optical connector plug to be connected with an optical adapter formed via a partition wall provided in a plural branch structured module, is provided with canceling levers (11), each including locking pieces (12) for engaging with the adapter and locking pieces (11*a*) on a rear end portion, on one surface in a longitudinal direction of a plug main body (1) from a front side toward a rear side, and a slider (13) movably attached to regulation regions in an axial direction of the plug main bodies (1) via a holder portion which is divided into upper and lower portions (19*a*, 19*b*) for incorporating plug main bodies (1), and the slider (13) has cam portions (13*a*) which engage with the canceling pieces (11*a*) on each of the canceling levers (11) so as to be capable of pressing them.

11 Claims, 10 Drawing Sheets

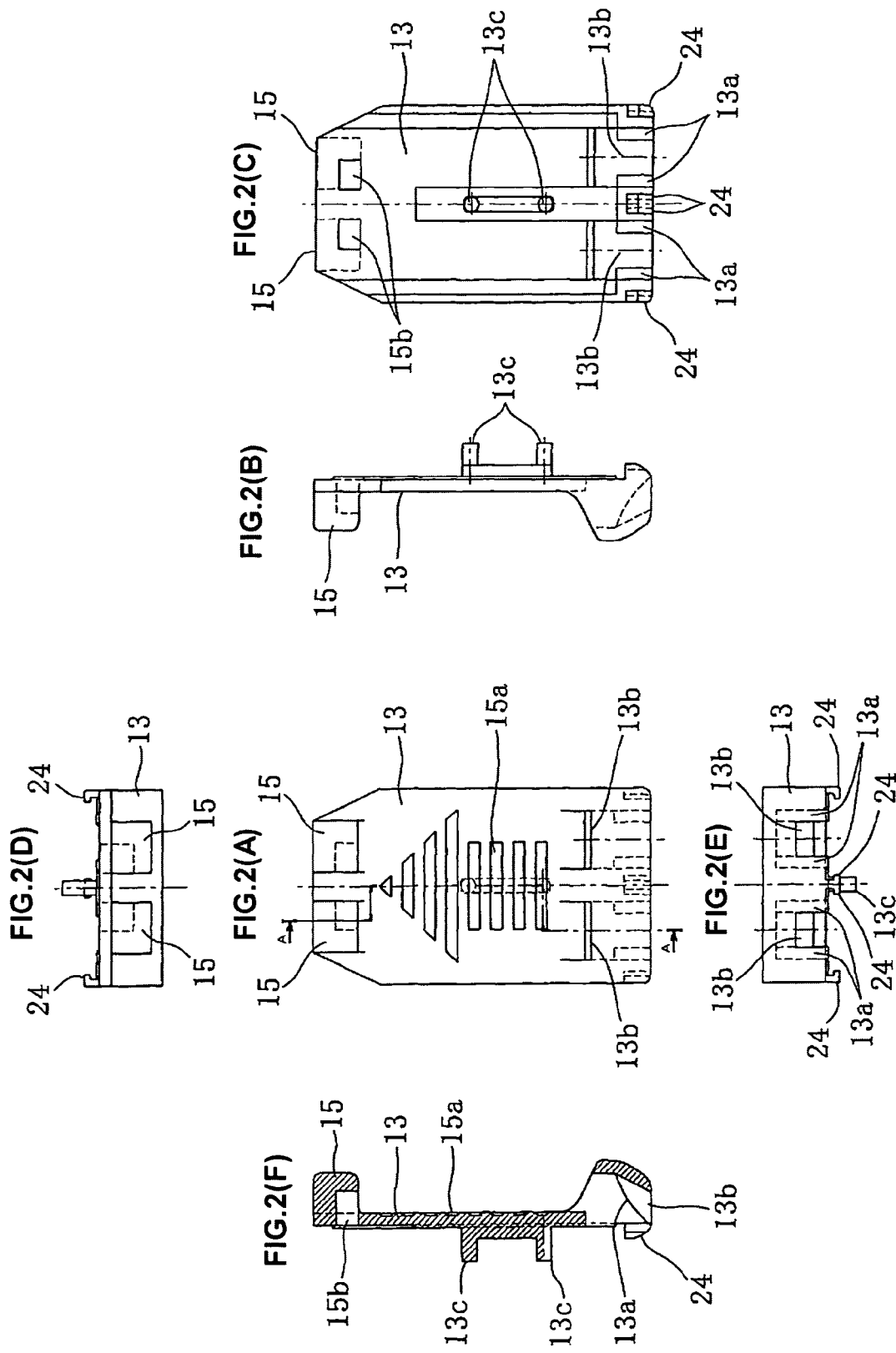

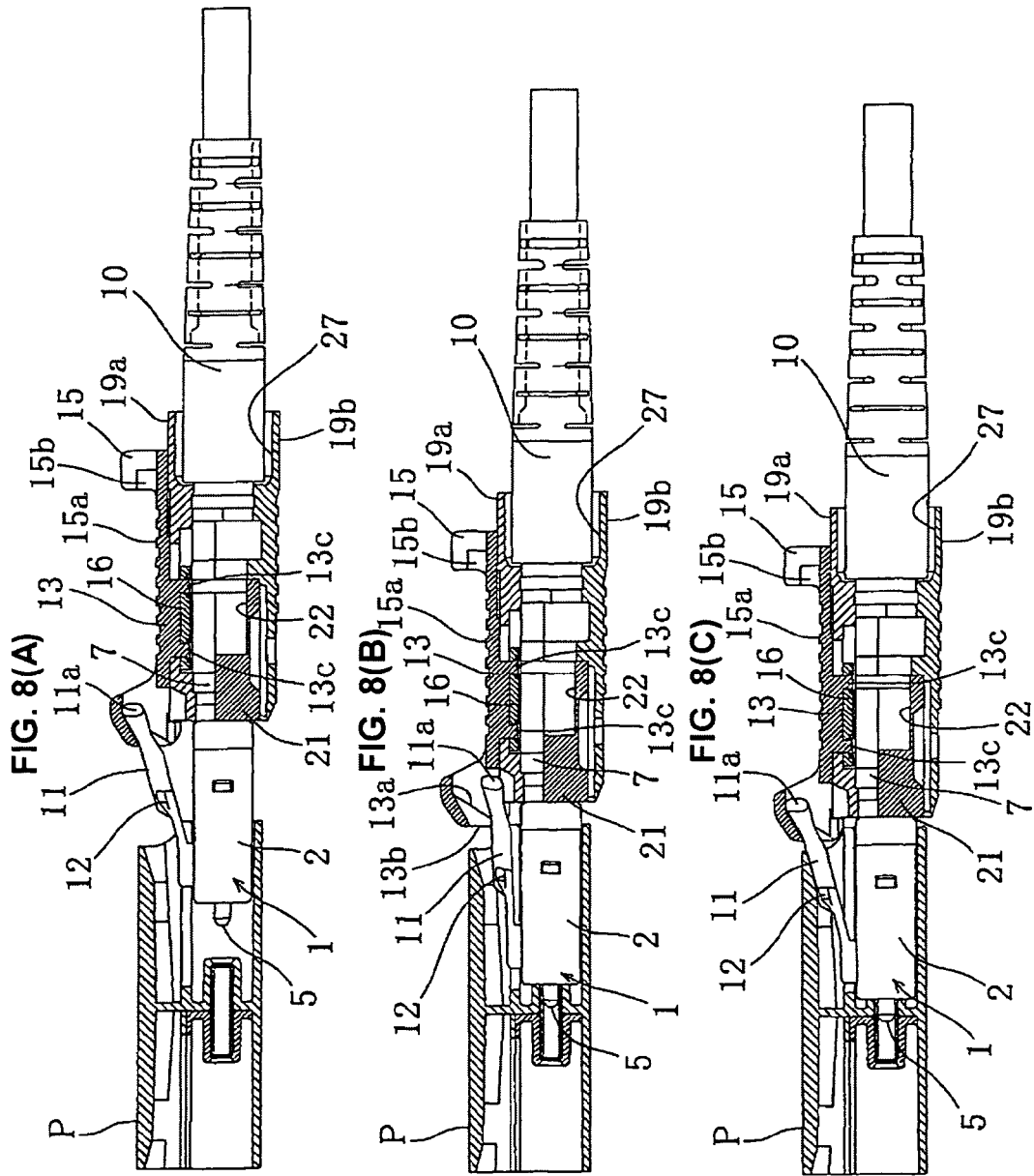

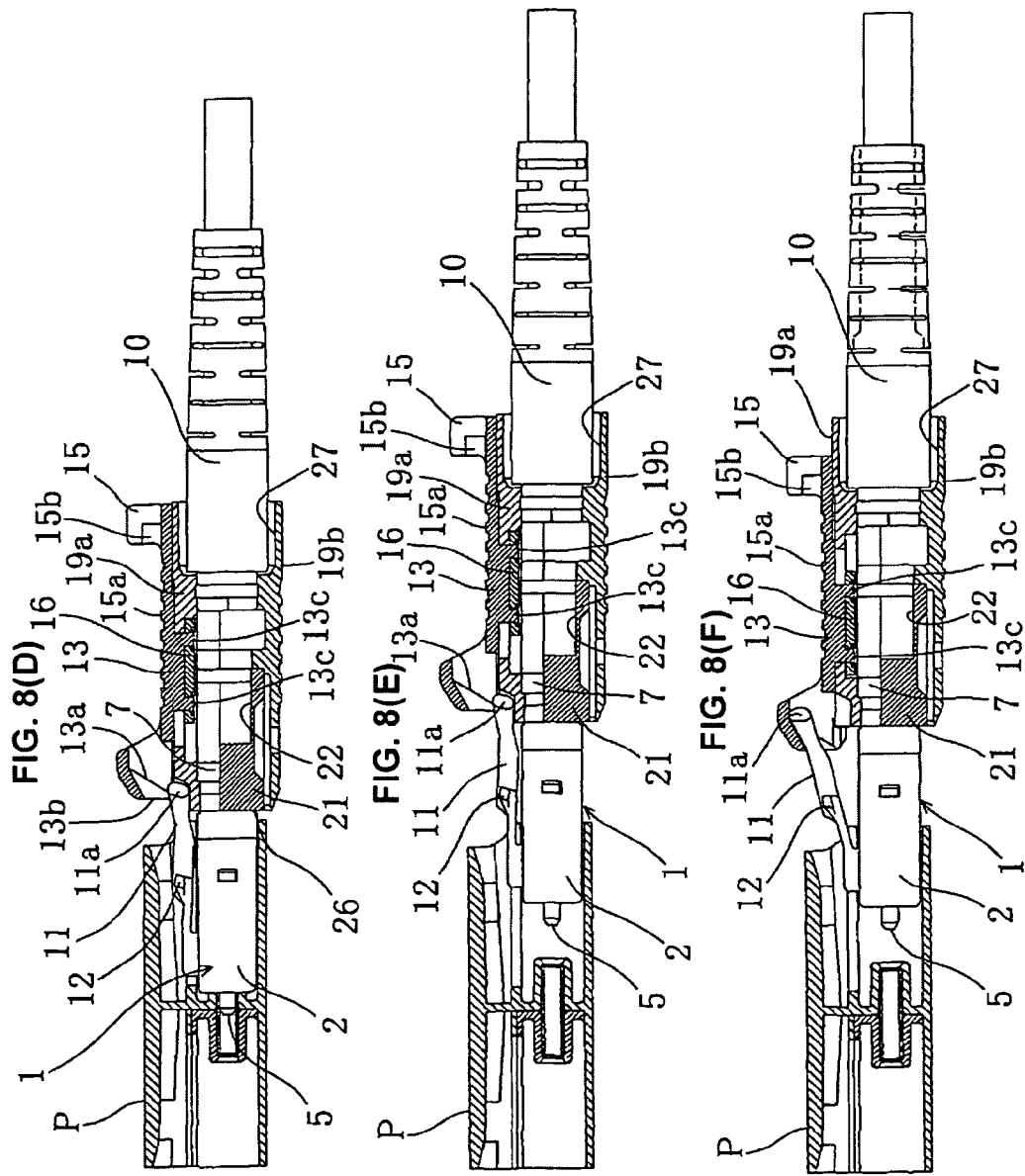

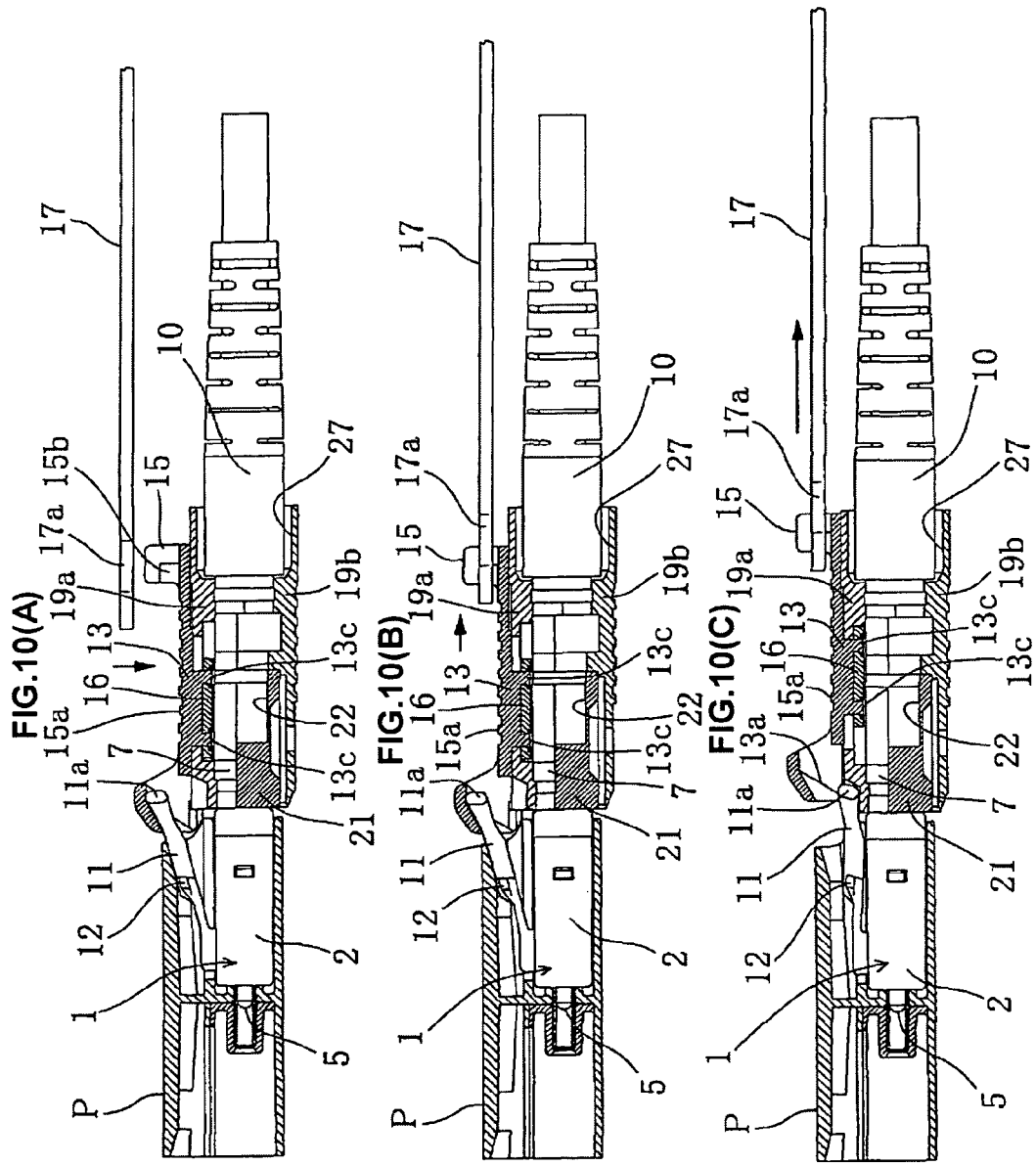

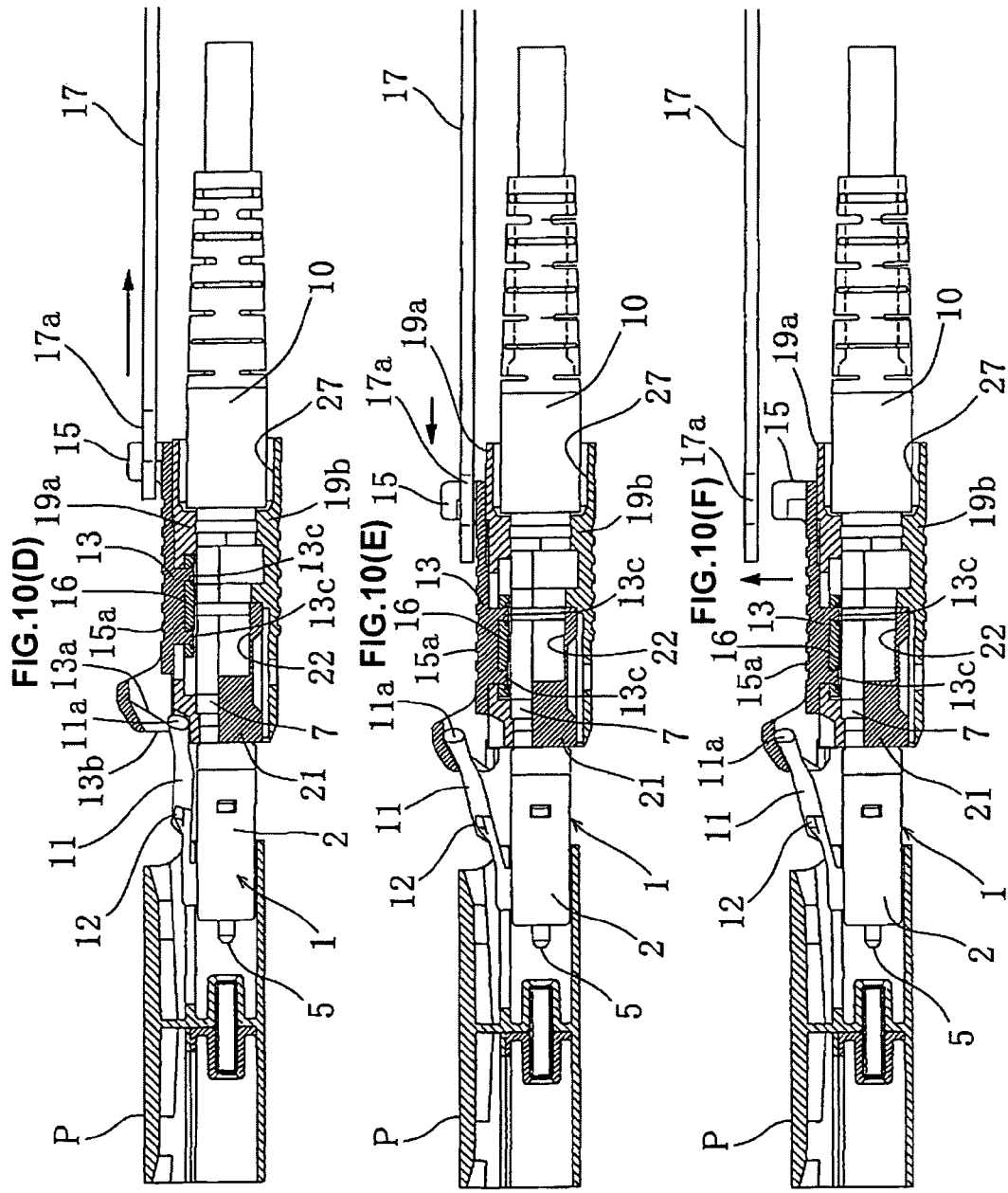

OPTICAL CONNECTOR PLUG

BACKGROUND OF THE INVENTION

1. Field of the Invention

The present invention relates to an optical connector plug with canceling levers used at a time of connecting optical fibers, and relates to a multiple optical type connector plug with improved operability for attaching to and detaching from an adapter.

2. Description of the Conventional Art

Conventionally, this kind of optical connector plug is integrally provided with a latch for carrying out engagement with and disengagement from an adapter on an outer peripheral surface of a plug housing. The latch extends obliquely, so as to be away from an outer surface of the plug housing gradually, toward a rear end portion from a front end portion of the plug housing. In the case that the optical connector plug is attached to the adapter, the latch protrudes slightly at the rear end of the adapter. Further, at a time of detaching the optical connector plug from the adapter, the engagement is canceled by directly pushing down the latch by a fingertip.

Further, the optical connector plug may be independently provided with a latch canceling member engaged with the rear end portion of the latch at a main body frame side, whereby the engagement with the adapter is canceled by indirectly pushing down the latch via the latch canceling member.

SUMMARY OF THE INVENTION

Problem to be Solved by the Invention

In recent years, since high density mounting of optical connectors is required, there appears a compact connector plug in which engagement of a latch an adapter is cancelled by a latch canceling member at a time of detaching the optical connector plug from the adapter. However, it becomes hard to operate the latch canceling member due to its compact size, and there occurs a circumstance that the optical connector plug can not be detached without using a tool.

In other words, since it is necessary to cancel the engagement by directly pushing down the latch of the optical connector plug which slightly protrudes at the rear end of the adapter, or cancel the engagement by indirectly pushing down the latch via the latch canceling member as shown by the prior art mentioned above, operability is not good particularly in case of high density mounting.

Then, the present invention is made by taking into consideration the conventionally existing various circumstances mentioned above, and an object of the present invention is to provide a compact multiple type optical connector plug in which a canceling lever can be easily operated without using any special tool even in case of high density mounting.

Means for Solving the Problem

In order to achieve the object mentioned above, in accordance with the present invention, there is provided a multiple type optical connector plug capable of being inserted to and taken out from each of insertion portions of an optical adapter formed via a partition wall, the multiple type optical connector plug including:

canceling levers, each of which is formed on one surface in a longitudinal direction of a plug main body from a front side toward a rear side, provided with locking pieces at an approximately middle portion for engaging with the adapter, and provided with canceling pieces on a rear end portion; and a slider movably attached to regulation regions in an axial direction of the plug main bodies via a holder portion in which a plurality of the plug main bodies are incorporated, wherein the slider has a plurality of cam portions which engage with the canceling pieces on each of the canceling levers of a plurality of plug main bodies so as to be capable of being pressed.

The canceling lever is moved downward by guides of the adapter together with the locking pieces at a time when the plug main bodies are attached to the adapter, the locking pieces and the adapter are capable of being engaged, the canceling pieces of the canceling lever are pushed down by the cam portions of the slider by moving the slider in a detaching direction with respect to the holder portion at a time of detaching from the adapter, the movement is regulated by a stopper after the engagement between the locking pieces and the adapter is canceled, and the plug main bodies and the canceling levers are returned to their original positions on the basis of elastic force of the canceling levers at the same time when the slider is detached from the adapter.

The movement regulating range of the slider is set by a length of a sliding elongate hole which is formed in the upper surface of the holder portion in order that leg portions provided to protrude from the slider lower surface are inserted and held therein so as to be slidable forward and rearward.

A convex operating portion for gripping at a time of operating is provided on an upper surface of a rear end of the slider.

The operating portions of the slider are provided with hook attaching portions capable of being attached to and detached from a hook portion of a pull-out tab with which the slider can be operated at a rear cord side.

EFFECT OF THE INVENTION

In accordance with the present invention, it is possible to easily operate the canceling levers without using any tool even in a case of high density mounting. In other words, in accordance with the present invention, the multiple optical connector plug capable of being inserted to and taken out from each of the insertion portions of the multiple optical adapter formed via the partition wall is structured such that the multiple optical connector plug includes the canceling levers, each of which is formed in one surface in the longitudinal direction of the plug main body from the front side toward the rear side, provided with the locking pieces at the approximately middle portion for engaging with the adapter, and provided with the canceling pieces on the rear end portion, and the slider movably attached to the regulation regions in the axial direction of the plug main bodies via the holder portion in which a plurality of the plug main bodies are incorporated, and the slider has a plurality of the cam portions which engage with the canceling pieces on each of the canceling levers of a plurality of the plug main bodies so as to be capable of pressing them. Accordingly, it is possible to easily operate the canceling levers only by the moving operation in the front and rear direction of the slider. Therefore, the operability is significantly improved even in case of compact optical connector plugs being mounted at high density.

The canceling lever is moved downward by the guides of the adapter together with the locking pieces at a time when the plug main bodies are attached to the adapter, the locking pieces and the adapter are capable of being engaged, the canceling pieces of the canceling lever are pushed down by the cam portions of the slider by moving the slider in the detaching direction with respect to the holder portion at a time of detaching from the adapter, the movement is regulated by the stopper after the engagement between the locking pieces and the adapter is canceled, and the plug main bodies and the canceling levers are returned to their original positions on the basis of the elastic force of the canceling levers at the same time when the slider is detached from the adapter. Accordingly, it is possible to easily and securely attach the plug main body to the adapter in case of compact multiple type optical connector plugs being mounted at high density.

The movement regulating range of the slider is set by the length of the sliding elongate hole which is formed in the upper surface of the holder portion in order that the leg portions provided to protrude from the slider lower surface are inserted and held therein so as to be slidable forward and rearward. Accordingly, for example, the rear end edge side position of the sliding elongate hole is arranged at least rear side than the position at which the engagement between the locking pieces and the adapter is cancelled by the movement of the slider, the movement of the slider is regulated by the rear end edge of the sliding elongate hole at a time of operating the slider so as to move rearward in the detaching direction, whereby force for activating the plug main body rearward is generated, and the plug main body can be detached from the adapter. Further, the movement of the slider is regulated by the front end edge of the sliding elongate hole at a time of operating the slider so as to move forward in the attaching direction, force activating the plug main body forward is thereby generated, and the plug main body can be attached to the adapter. Accordingly, it is possible to detach the plug main body from the adapter through one-touch operation and smoothly in case of compact multiple type optical connector plugs being mounted at high density.

The convex operating portion for gripping at a time of operating is provided on the upper surface of the rear end of the slider. Accordingly, it is possible to smoothly move the slider in the front and rear direction only by operating the operating portion with a fingertip. Therefore, even in case of compact optical connector plugs being mounted at high density, the operability is significantly improved.

The operating portions of the slider are provided with the hook attaching portions capable of being attached to and detached from the hook portion of the pull-out tab with which the slider can be operated at the rear cord side. Accordingly, it is possible to smoothly move the slider in the rearward direction with respect to the holder portion only by operating the pull-out tab with fingertips. Therefore, even in case of compact multiple type optical connector plugs being mounted at high density, the operability is significantly improved.

BRIEF DESCRIPTION OF DRAWINGS

FIGS. 2A to 2F show one embodiment of a slider in accordance with the present invention, in which FIG. 2A is a plan view, FIG. 2B is a side view, FIG. 2C is a bottom view, FIG. 2D is a rear view, FIG. 2E is a front view, and FIG. 2F is a sectional view along a line A-A;

FIGS. 3A and 3B show a state that the slider is assembled with an upper holder portion, in which FIG. 3A is an exploded sectional view before being assembled, and FIG. 3B is a sectional view after being assembled;

FIGS. 4A and 4B show a state that an IC chip and a presser plate are incorporated in a lower holder portion, in which FIG. 4A is an exploded sectional view before being incorporated, and FIG. 4B is a sectional view after being incorporated;

FIGS. 7A and 7B explain a motion of the slider, in which FIG. 7A is a side view of a state that the slider is moved forward with respect to the upper holder portion, and FIG. 7B is a side view of a state that the slider is moved rearward with respect to the upper holder portion;

FIGS. 8(A) to 8(C) are explanatory sectional views showing a procedure of attaching an optical connector plug to an adapter;

FIGS. 8(D) to 8(F) are explanatory sectional views showing a procedure of detaching the optical connector plug from the adapter;

FIGS. 10(A) to 10(C) are explanatory sectional views showing a procedure of detaching the optical connector plug from the adapter by using the pull-out tab; and FIGS. 10(D) to 10(F) are explanatory sectional views showing a procedure of detaching the optical connector plug from the adapter by using the pull-out tab.

DETAILED DESCRIPTION OF PREFERRED EMBODIMENT

A description will be in detail given below of a best mode for embodying an optical connector plug in accordance with the present invention with reference to the accompanying drawings.

The present invention relates to a multiple type optical connector plug which can be inserted to and pulled out from each of insertion portions of a multiple type optical adapter formed via a partition wall provided in a module having a plural branch structure, for example, within a high density local terminating optical cabinet.

As the optical connector plug, for example, two LC type plug main bodies 1 are arranged in parallel, both two-branched fibers are respectively adhered and fixed to both the plug main bodies 1, both end surfaces are ground, and both the ground plug main bodies 1 are incorporated into a holder portion mentioned below so as to be constructed as a double structure. In this case, needless to say, that the present invention is not limited to the double type optical connector plug, but may be constructed as a triple or quaternary optical connector plug.

Figure 1:
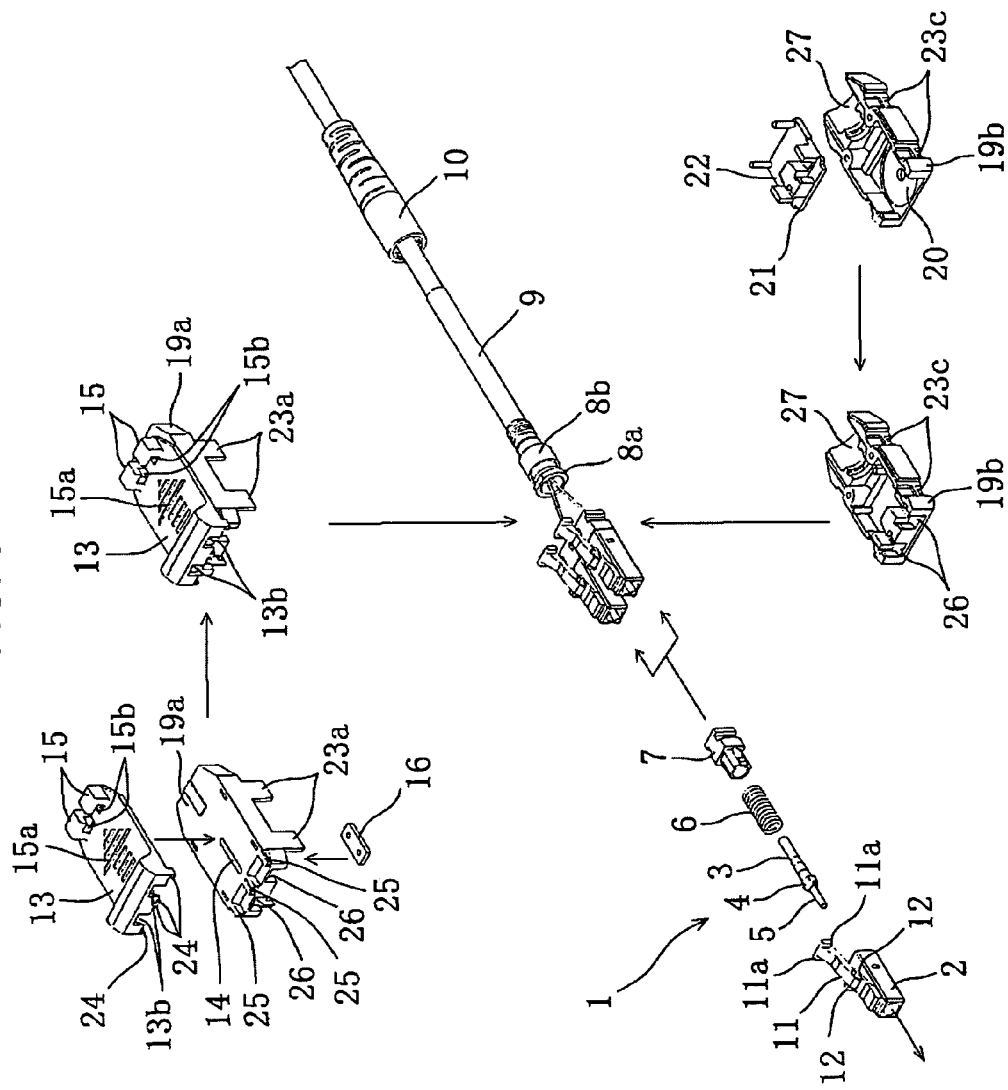
FIG. 1 is an exploded perspective view of an optical connector plug in a best mode for embodying the present invention.

Further, the plug main body 1 is provided with a coupling sleeve 2 made of a plastic having a comparatively high strength, a ferrule 5 incorporated into the coupling sleeve 2 with a ferrule tube 3 and a ferrule holder 4, a spring 6 wound around an outer periphery of the ferrule tube 3, and a plastic extender cap 7 fitted to a rear end portion of the coupling sleeve 2 via the spring 6, as shown in FIG. 1.

In the case of assembling the plug main body 1, as shown in FIG. 1, the extender cap 7 is fixed to the coupling sleeve 2, by sequentially inserting the ferrule 5, the spring 6 and the extender cap 7 to the coupling sleeve 2, and engaging a locking pawl of the extender cap 7 with a locking hole of the coupling sleeve 2, and the ferrule 5 is retained within the coupling sleeve 2 via the spring 6 while being energized forward in an axial direction. Further, a heat shrinkable tube 9 provided with a caulking holder 8a and a caulking ring 8b for protecting an optical fiber to prevent breakage or the like caused by deformation, and a boot 10 are provided at a rear side of the extender cap 7.

Further, as shown in FIGS. 1, 8.1, 8.2, 10.1 and 10.2, an outer peripheral surface of the coupling sleeve 2 is provided with locking pieces 12 at approximately middle portions of both side surfaces in a width direction, for engaging with an adapter P and canceling the engagement, and a canceling lever 11 provided with a pair of canceling pieces 11a protruding sideward with respect to the axial direction at right and left symmetrical positions of the rear end is integrally provided in an upper portion of the coupling sleeve 2.

The canceling lever 11 is provided to extend obliquely, so as to be away from an outer surface of the coupling sleeve 2 gradually, from a leading end portion toward a rear end portion on one surface in a longitudinal direction of the coupling sleeve 2 of the plug main body 1, and a pair of the right and left canceling pieces 11a of a rear end portion thereof have a complementary relation to cam portions 13a so as to be brought into contact with the cam portions 13a existing at right and left symmetrical positions in an inner side of an opening portion 13b of the slider 13 as mentioned below.

Further, two plug main bodies 1 are incorporated into upper and lower divided holder portions 19a and 19b in a state of being adjacent to each other, and an upper surface of the upper holder portion 19a is provided with a slider 13 which is installed so as to be movable within a regulated range in the axial direction of each of the plug main bodies 1.

Figure 3A:
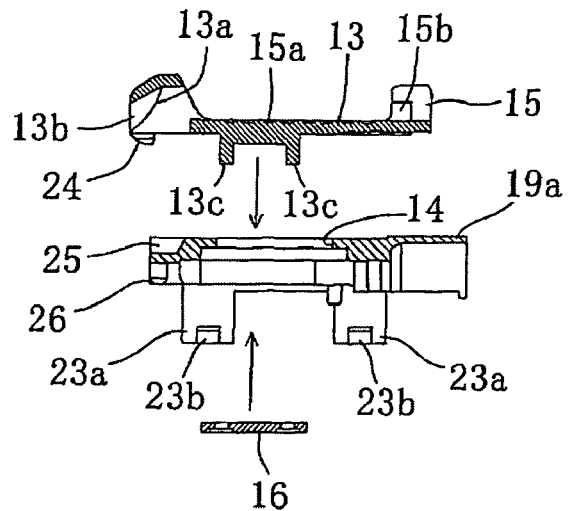
Figure 3B:
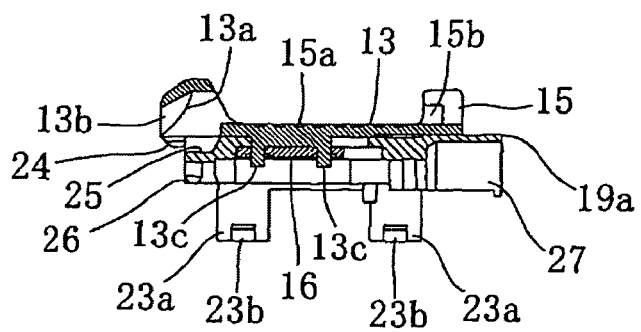
Figure 4A:
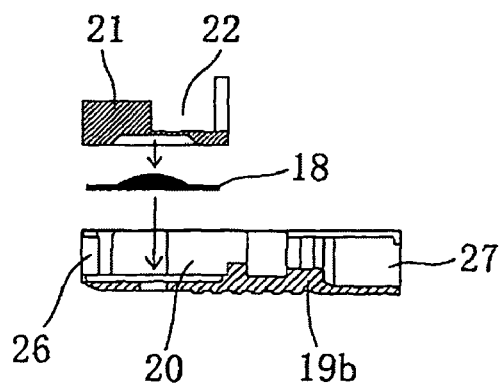
Figure 4B:
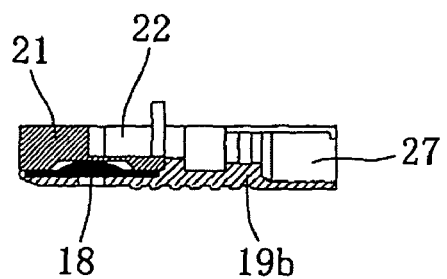
Figure 5:
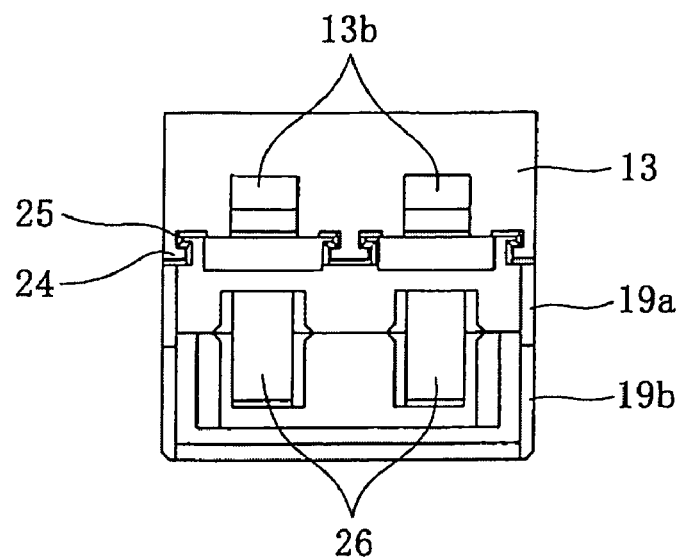
FIG. 5 is a front view showing a state after the slider and the upper and lower holder portions are incorporated.

In other words, the holder portions 19a and 19b are constituted by the upper holder portion 19a shown in FIGS. 3A and 3B, and the lower holder portion 19b shown in FIGS. 4A and 4B, and a sliding elongate hole 14 which is long in a front and rear direction is provided at an approximately middle portion of the upper surface of the upper holder portion 19a. A pair of front and rear leg portions 13c provided to protrude from a lower surface of the slider 13 are inserted to the sliding elongate hole 14, and the slider 13 itself is retained so as to be slidable forward and rearward along the upper surface of the upper holder portion 19a by inserting both the leg portions 13c into a pair of front and rear holes of a rectangular stopper plate 16 installed from a lower side, and caulking them from an opposite side. At this time, the movement regulated range of the slider is set by a length in the front and rear direction of the sliding elongate hole 14 formed in the upper surface of the upper holder portion 19a.

On the other hand, the lower holder portion 19b is provided with a concave portion 20 accommodating an IC chip 18 on an inner bottom surface, and is structured such as to accommodate the IC chip 18 in the concave portion 20 and pinch it fixedly by a presser plate 21 from an upper side. Further, a pair of right and left plug accommodating concave portions 22 communicating with each other are formed on an upper surface of the presser plate 21, so to accommodate two plug main bodies 1 adjacently therein.

Further, pairs of front and rear arms 23a are provided downward at both right and left sides of the upper holder portion 19a, locking pawls 23b are provided to protrude from an inner side of a lower end of the arm 23a, and the locking pawls 23b are engaged with pairs of front and rear locking concave portions 23c provided at both right and left sides of the lower holder portion 19b, whereby both the holder portions 19a and 19b are integrally assembled (refer to FIG. 1). At this time, a pair of right and left plug side opening portions 26 having a rectangular opening shape is formed in a front side surfaces of both the holder portions 19a and 19b, on the basis of a combination of both the holder portions 19a and 19b, thereby forming a state in which the respective coupling sleeves 2 of both the plug main bodies 1 protrude from both the plug side opening portions 26, and each of the extender caps 7, the caulking holder 8a, and the caulking ring 8b are locked and retained. Further, a boot side opening portion 27 having a circular opening shape is formed in the middle of the rear side surface thereof, and the boot 10 pressure-inserted to the caulking ring 8b is extended out toward the rear side through the boot side opening portion 27 (refer to FIGS. 1, 4 and 8).

The slider 13 is provided with the cam portions 13a engaging with the canceling pieces 11a of the canceling levers 11 of the plug main bodies 1 so as to be capable of pressing them. In other words, the cam portions 13a are formed at right and left symmetrical positions in an inner side of the opening portion 13b formed at a front end side of the slider 13 so as to have approximately circular arc shaped taper surfaces respectively, and a pair of right and left canceling pieces 11a on an oblique rear end portion of the canceling lever 11 are respectively engaged with the cam portions 13a.

Specifically, as shown in FIGS. 2F, 3A, 3B and 6, the slider 13 is structured such that a front end side of the upper surface thereof is protruded somewhat toward a obliquely front side, two adjacent opening portions 13b having an approximately C-shaped arch form are provided through in a front and rear direction in order to the form spaces to enable canceling levers 11 to move approximately in a direction orthogonal to the axial direction, at the upper side where inner sides of the protrusions face to the extender caps 7, and the right and left symmetrical portions in the inner side of each of the opening portions 13b form the cam portions 13a which are obliquely made toward a front end side of the extender cap 7. A pair of right and left canceling pieces 11a on the oblique rear end portion of the canceling lever 11 are engaged with the cam portions 13a.

Further, as shown in FIGS. 5, 6, 7A and 7B, L-shaped protruding engagement projections 24 are provided at both right and left ends and the middle of a front end side lower edge portion of the slider 13 so as to be directed to the opening portion 13b side, and the engagement projections 24 are fitted to engaged portions 25, which are formed in an approximately C-shaped long groove form at a front end side upper edge portion of the upper holder portion 19a in correspondence to the engagement projections 24, from a front side to a rear side. Accordingly, even if pressing force is applied to the cam portions 13a by the canceling levers 11 of the plug main bodies 1, the slider 13 is prevented from being lifted upward from the holder portion 19.

Figure 6:
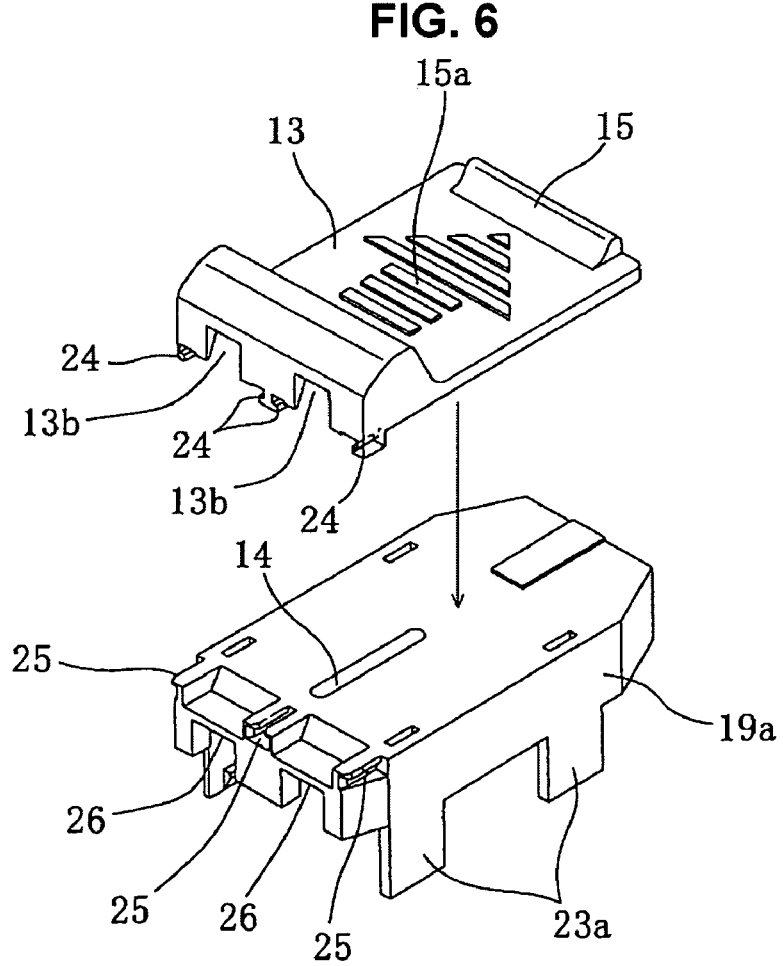
FIG. 6 is an exploded perspective view of the slider and the upper holder portion.
Figure 7A:
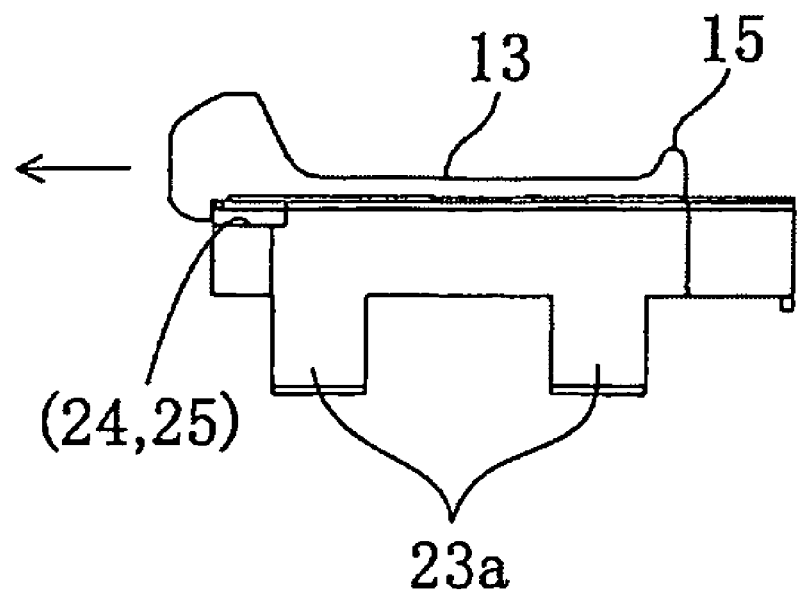
Figure 7B:
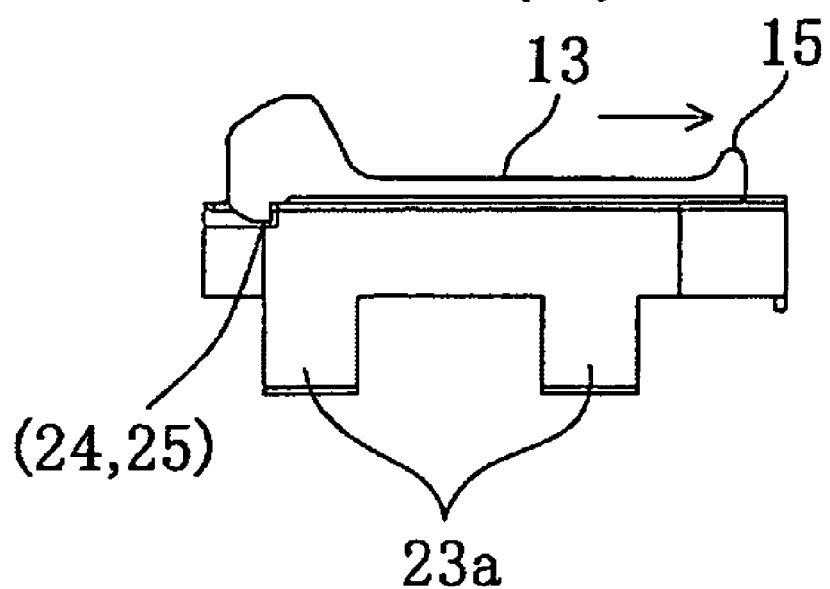

The middle upper surface of the slider 13 has a gripping surface portion 15a in which a knurling for preventing slippage is formed, and a convex-shaped operating portion 15 for gripping at a time of operating is provided on a rear end upper surface of the slider 13. The operating portions 15 may be constituted by a simple wide projection, as shown in FIGS. 6, 7A and 7B.

Figure 9:
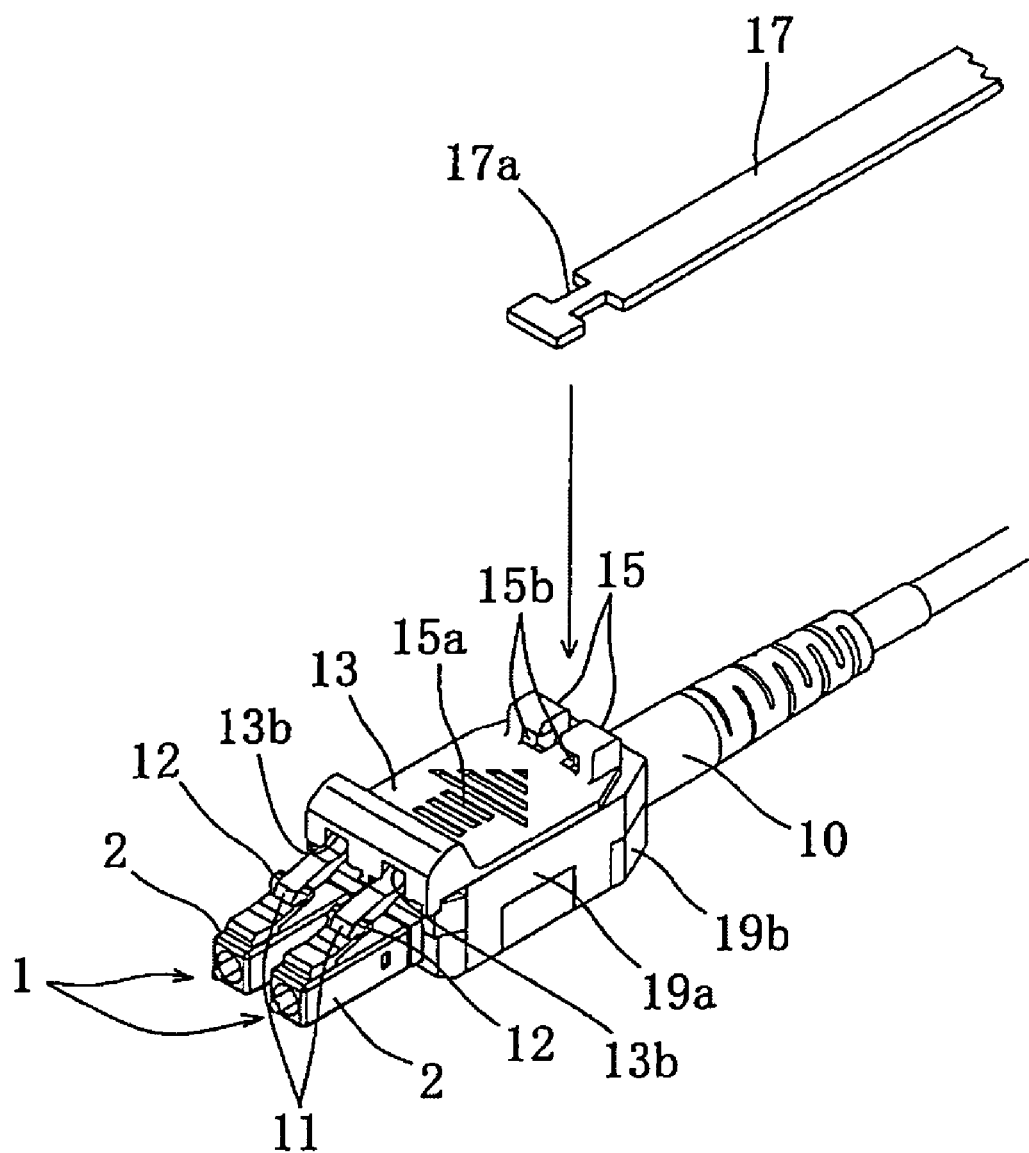
FIG. 9 is a perspective view of a state before a pull-out tab is attached to a slider.

Alternately, the operating portions 15 may be formed to have a pair of right and left L-frame-shaped hook installation portions 15b via an intermediate slit as shown in FIGS. 1, 2A, 2B, 2C, 2F, 3A and 3B, and a hook portion 17a formed via a neck portion of a band plate shaped pull-out tab 17 for operating the slider 13 at a rear cord side may be attached to and detached from the hook installation portions 15b, as shown in FIG. 9. The slider 13 is moved in a disconnecting direction together with the pull-out tab 17 moved in the disconnecting direction.

Further, the plug main bodies 1 are installed to an adapter P, and the plug main bodies 1 and the adapter P are engaged by the locking pieces 12 of the canceling levers 11, as shown in FIG. 8.1 at a time of installing.

In other words, when the plug main bodies 1 are installed to the adapter P, the locking pieces 12 of the canceling levers 11 are pressed by guides of the plug insertion holes of the adapter P as shown in FIGS. 8.1A to 8.1C, and the canceling levers 11 are installed while being moved downward together with the locking pieces 12. Further, since the locking pieces 12 are elastically locked to steps formed at sides beyond the guides of the adapter P, the locking pieces 12 and the adapter P can be engaged.

Further, at a time of installing to the adapter P, the plug main bodies 1 may be indirectly operated in place of being directly operated. In this case, when the slider 13 is moved in the direction toward the adapter P, the movement of the slider 13 is regulated by the sliding elongate hole 14 of the upper holder portion 19a, the plug main bodies 1 can be installed to the adapter P, the locking pieces 12 and canceling levers 11 are moved downward by the guides of the adapter P, and the locking pieces 12 and the adapter P are engaged. At this time, as shown in FIGS. 8.1A to 8.1C, and 8.2D to 8.2F, the guides having the steps toward the inner side are formed in the plug insertion holes of the adapter P, and the locking pieces 12 are locked into the steps of the guides.

On the other hand, when the plug main bodies 1 are detached from the adapter P, the canceling pieces 11a of the canceling levers 11 are pushed down by the cam portions 13a of the slider 13 as the result of moving the slider 13 on the upper surface of the upper holder portion 19a in the detaching direction, as shown in FIGS. 8.2D to 8.2F. Accordingly, the engagement between the locking pieces 12 and the adapter P is easily canceled.

As this time, as shown in FIGS. 8.1A to 8.1C, and 8.2D to 8.2F, since the rear end edge side position of the sliding elongate hole 14 is arranged at least at a rear side than the position at which the engagement between the locking pieces 12 and the adapter P is cancelled, the movement of the slider 13 is regulated by the rear end edge of the sliding elongate hole 14 as shown in FIGS. 8.2D to 8.2F at a time of operating the slider 13 to move rearward in the detaching direction, whereby force for activating the plug main bodies 1 rearward is generated, and it is possible to detach the plug main bodies 1 from the adapter P. At this time, the slider 13 is returned to the original position on the basis of elastic force of the canceling levers 11 at the same time of being detached from the adapter P.

Further, at a time of operating the slider 13 so as to move forward in the attaching direction, the movement of the slider 13 is regulated by the front end edge of the sliding long hole 14, as shown in FIGS. 8.1A to 8.1C, whereby force for activating the plug main bodies 1 forward is generated, and it is possible to attach the plug main bodies 1 to the adapter P.

Next, a description will be given in detail of one example of use of the best mode of the optical connector plug in accordance with the present invention structured as mentioned above.

When the plug main bodies 1 are attached to the adapter P, the plug main bodies 1 are moved in the adapter P attaching direction by holding the operating portions 15 or the grip surface portion 15a of the slider 13 and the lower holder portion 19b by a fingertip, as shown in FIGS. 8.1A to 8.1C. At this time, since the movement of the slider 13 is regulated by the front end edge of the sliding elongate hole 14, the plug main bodies 1 can be moved into the adapter P. At the same time, the canceling levers 11 are moved downward by the guides of the adapter P together with the locking pieces 12, and the locking pieces 12 and the adapter P are engaged, whereby the plug main bodies 1 are attached to the adapter P.

On the other hand, at a time of detaching the plug main bodies 1 from the adapter P, the plug main bodies 1 are moved in the detaching direction while holding the operating portions 15 or the grip surface portion 15a of the slider 13 by a fingertip. At this time, since the canceling pieces 11a on the rear end portions of the canceling levers 11 are pushed down by the cam portions 13a of the slider 13, the engagement between the locking pieces 12 and the adapter P is cancelled.

When the slider 13 is further moved in the detaching direction, the plug main bodies 1 can be detached from the adapter P because the movement of the slider 13 is regulated by the rear end edge of the sliding elongate hole 14. Further, as shown in FIG. 8.2F, the slider 13 itself is returned to the original position by elastic force of the canceling levers 11 at the same time when the slider 13 is detached from the adapter P.

Further, in order to make it possible to operate the slider 13 at the rear cord side, the hook portion 17a of the pull-out tab 17 is attached to the hook attaching portions 15b of the operation portions 15 of the slider 13, as shown in FIGS. 9 and 10.1A.

Further, at a time of detaching the plug main bodies 1 from the adapter P, the pull-out tab 17 is moved by fingertips in the detaching direction, whereby the slider 13 is moved in the same detaching direction, as shown in FIGS. 10.1B and 10.1C, and the engagement between the locking pieces 12 and the adapter P is canceled as the result that the canceling pieces 11a on the rear end portions of the canceling levers 11 are pushed down by the cam portions 13a of the slider 13.

As shown in FIG. 10.2D, the plug main bodies 1 are detached from the adapter P by further moving the pull-out tab 17 in the detaching direction. Further, when the fingertip is released from the pull-out tab 17, the slider 13 itself is returned to the original position by the elastic force of the canceling levers 11. Finally, after the pull-out tab 17 is somewhat moved forward as shown in FIG. 10.2E, the hook portion 17a of the pull-out tab 17 is lifted up and detached from the hook attaching portions 15b of the operation portions 15 of the slider 13, as shown in FIG. 10.2F.

What is claimed is:

1. A multiple type optical connector plug capable of being inserted to and taken out from each of insertion portions of an optical adapter formed via a partition wall, the multiple type optical connector plug comprising:

canceling levers, each of which is formed on one surface in a longitudinal direction of a plug main body from a front side toward a rear side, provided with locking pieces at an approximately middle portion for engaging with the adapter, and provided with canceling pieces on a rear end portion; and a slider movably attached to regulation regions in an axial direction of the plug main bodies via a holder portion in which a plurality of the plug main bodies are incorporated, said slider having a plurality of cam portions which engage with the canceling pieces on each of the canceling levers of a plurality of plug main bodies so as to be capable of being pressed, wherein said canceling lever is moved downward by guides of the adapter together with the locking pieces at a time when the plug main bodies are attached to the adapter, the locking pieces and the adapter are capable of being engaged, the canceling pieces of the canceling levers are pushed down by the cam portions of the slider by moving the slider in a detaching direction with respect to the holder portion at a time of detaching from the adapter, the movement is regulated by a rear end edge of a sliding elongate hole after the engagement between the locking pieces and the adapter is canceled, and the plug main bodies and the canceling lever are returned to their original positions on the basis of elastic force of the canceling levers at the same time when the slider is detached from the adapter.

2. An optical connector plug as claimed in claim 1, wherein the movement regulating range of the slider is set by a length of said sliding elongate hole which is formed in the upper surface of the holder portion in order that leg portions provided to protrude from the slider lower surface are inserted and held therein so as to be slidable forward and rearward.

3. An optical connector plug as claimed in claim 1, wherein the movement regulating range of the slider is set by a length of said sliding elongate hole which is formed in the upper surface of the holder portion in order that leg portions provided to protrude from the slider lower surface are inserted and held therein so as to be slidable forward and rearward.

4. An optical connector plug as claimed in claim 1, wherein a convex operating portion for gripping at a time of operating is provided on an upper surface of a rear end of the slider.

5. An optical connector plug as claimed in claim 1, wherein a convex operating portion for gripping at a time of operating is provided on an upper surface of a rear end of the slider.

6. An optical connector plug as claimed in claim 2, wherein a convex operating portion for gripping at a time of operating is provided on an upper surface of a rear end of the slider.

7. An optical connector plug as claimed in claim 3, wherein a convex operating portion for gripping at a time of operating is provided on an upper surface of a rear end of the slider.

8. An optical connector plug as claimed in claim 4, wherein the operating portions of the slider are provided with hook attaching portions capable of being attached to and detached from a hook portion of a pull-out tab with which the slider can be operated at a rear cord side.

9. An optical connector plug as claimed in claim 5, wherein the operating portions of the slider are provided with hook attaching portions capable of being attached to and detached from a hook portion of a pull-out tab with which the slider can be operated at a rear cord side.

10. An optical connector plug as claimed in claim 6, wherein the operating portions of the slider are provided with hook attaching portions capable of being attached to and detached from a hook portion of a pull-out tab with which the slider can be operated at a rear cord side.

11. An optical connector plug as claimed in claim 7, wherein the operating portions of the slider are provided with hook attaching portions capable of being attached to and detached from a hook portion of a pull-out tab with which the slider can be operated at a rear cord side.

* * * * *